(12) United States Patent
Finnebraaten

(10) Patent No.: US 6,270,643 B1
(45) Date of Patent: Aug. 7, 2001

(54) METHOD OF EFFECTING FLUID FLOW IN POROUS MATERIALS

(75) Inventor: Jorn Inge Finnebraaten, Moss (NO)

(73) Assignee: Harden Technologies Limited (GB)

( * ) Notice: Subject to any disclaimer, the term of this patent is extended or adjusted under 35 U.S.C. 154(b) by 0 days.

(21) Appl. No.: 09/214,879

(22) PCT Filed: Jun. 25, 1996

(86) PCT No.: PCT/GB96/01528

§ 371 Date: Jan. 14, 1999

§ 102(e) Date: Jan. 14, 1999

(87) PCT Pub. No.: WO97/01684

PCT Pub. Date: Jan. 16, 1997

(30) Foreign Application Priority Data

Jun. 27, 1995 (GB) .................................................. 9513080
Oct. 5, 1995 (GB) .................................................. 9520379

(51) Int. Cl.[7] .................................................. C25B 15/00
(52) U.S. Cl. .................................................. 204/515; 204/600
(58) Field of Search .................................................. 204/515, 600

(56) References Cited

U.S. PATENT DOCUMENTS

| 3,642,066 | 2/1972 | Gill | 166/248 |
| 4,671,874 | 6/1987 | Fremont et al. | 210/243 |
| 4,678,554 | 7/1987 | Oppitz | 204/299 |
| 5,368,709 | * 11/1994 | Utklev | 204/515 |

FOREIGN PATENT DOCUMENTS

| 0 401 519 A1 | 12/1990 | (EP) . |
| 0 614 709 A2 | 9/1994 | (EP) . |
| 1 523 627 | 9/1978 | (GB) . |
| 2 101 188 | 1/1983 | (GB) . |
| 2 175 609 | 12/1986 | (GB) . |
| WO 90/10767 | 9/1990 | (WO) . |

OTHER PUBLICATIONS

Abstract of Soviet Union Patent No. 477945 A entitled "Sequential Electroosmosis Cleaning of Water" (Oct. 19, 1972).

* cited by examiner

Primary Examiner—Arun S. Phasge
(74) Attorney, Agent, or Firm—Madson & Metcalf

(57) ABSTRACT

A method of effecting fluid movement in porous materials (e.g. metal reinforced concrete or porous geological media) by means of electroosmosis. The method comprises applying a sequence of voltage pulses between spaced apart electrodes (4, 5) having a region of porous material (1) therebetween. Each voltage pulse comprises a first portion in which an electroosmotically active first potential difference is applied between the electrodes (4, 5) to effect fluid movement in the region of porous material (1), and a second portion in which a second potential difference of opposite polarity is applied. In the case of metal reinforced concrete an additional voltage is applied to the metal reinforcement (2) in order to make the voltage of the metal reinforcement (2) negative with respect to the porous material (1) for at least part of the sequence of voltage pulses. The method is used for controlling humidity in metal reinforced concrete, treatment of water, irrigation, oil displacement in oil-/water-bearing strata.

28 Claims, 8 Drawing Sheets

METHOD OF EFFECTING FLUID FLOW IN POROUS MATERIALS

The present invention relates to a method of effecting fluid flow in porous materials and relates particularly, to a method of effecting fluid flow by means of electroosmosis.

Metal reinforced concrete has widespread uses in the construction industry, for example as walls, floors, columns of a building, bridge spans or piers, and many other such applications. Steel reinforcing rods are usually employed to provide metal reinforcement of cast concrete structures, so as to provide a matrix on which the cast material can be formed. This increases the resistance to tensile stresses of the cast building element, since concrete is strong in compression but much weaker in tension.

The cast building elements are usually constructed by locating metal reinforcing rods at desired locations within the intended cast structure, between shuttering, and then pouring the cast material into a space defined by the shuttering so as to surround the metal reinforcing rods. On setting of the cast material, the metal reinforcements become rigidly embedded within the cast slabs.

Although the metal reinforcements usually remain firmly embedded within the cast structure, problems often arise with metal reinforced concrete as a result of water penetration to the metal reinforcement. Such water penetration is a source of corrosion of metal reinforcements over a period of time, and the constituents of the concrete mixture may also have an adverse effect on the metal reinforcement. This can result in failure of the cast structure which in the case of building elements, can have very serious consequences.

It has been proposed to control the water content of concrete structures by means of electroosmosis. In a porous structure such as concrete, it is known that the walls of the capillaries are covered with an electrically charged, adsorbed water film, often referred to as an electrical double layer. Electroosmosis involves subjecting such a porous body to an electric field, which causes part of the double layer to tend to migrate under the influence of the field, which in turn can cause some of the free liquid in the pulses to be carried along in this process. This can lead to a significant reduction in the internal moisture content of the porous body.

In particular, U.S. Pat. No. 5,015,351 proposes the removal of water from porous building materials by applying a controlled cyclical voltage to an electrode system to effect osmotic migration of water from an anode located within the structure to a cathode spaced from the structure but in electrical contact therewith. The cycle includes a first energy pulse in a direction to effect osmotic migration, followed by a shorter pulse of reverse polarity to counteract formation of insulating gas films. However, the process proposed in U.S. Pat. No. 5,015,351 is believed to give unsatisfactory results when used on metal reinforced concrete structures.

It has been proposed in U.S. Pat. No. 5,368,709 to control the relative humidity in concrete structures by feeding an anode with a pulse sequence generated with a first negative pulse, followed by a neutral interval or a zero voltage interval, followed by a positive pulse, accompanied by simultaneous feeding of the cathode with a corresponding pulse sequence of inverted polarity to control the humidity and the structure.

When this process is used on reinforced concrete structures, a voltage potential on the steelwork, which becomes an anode, occurs, causing rapid corrosion of the steel ($Fe \rightarrow Fe^{2+}+2e$).

Also, a fixed pulse system does not have the ability to deal with variations in the design of reinforced concrete structures. A combination of the engineering mass of a structure from the volume of concrete and the amount of steelwork inside, together with the pore size of the matrix, requires the flexibility of variable pulse frequency.

Preferred embodiments of the present invention seek to overcome the above disadvantages of the prior art.

According to an aspect of the present invention there is method of effecting fluid movement in metal reinforced porous materials, the method comprising applying a sequence of voltage pulses between spaced apart first and second electrodes having a region of the porous material therebetween, each said voltage pulse comprising a first portion in which an electroosmotically active first potential difference is applied between said first and second electrodes to effect fluid movement in said region of porous material, and a second portion in which a second potential difference of opposite polarity to said first potential difference is applied between said first and second electrodes; and applying a voltage to a metal reinforcement located at least partly in said region of porous material to make the voltage of said metal reinforcement negative with respect to the porous material adjacent thereto for at least part of said sequence of voltage pulses.

The provision of the first portion of each pulse enables fluid movement in the porous material to be effected, while the provision of the second portion at least partly counteracts the formation of gas or other insulating films at the electrodes (which leads to a deterioration in the electrical performance of the system and results in low operating efficiency) and/or the formation of corrosion products. Making the voltage of the metal reinforcement negative with respect to the porous material adjacent thereto provides the further advantage of preventing or minimising corrosion of the metal reinforcement which may otherwise occur as a result of the electroosmosis process.

Preferably, the method is a method of controlling humidity in a metal reinforced building material, and wherein said first potential difference is positive.

By making the first potential difference positive, the process can be used to effect electroosmotic reduction in the humidity internal to a metal reinforced building material. This helps to reduce the corrosive nature of the surroundings of the metal reinforcement, whilst minimising corrosion of the metal reinforcement as a result of the electroosmosis process.

In a preferred embodiment, the building material is concrete. The method may be a method of treating water in which said porous material is immersed, and in which said first potential difference is negative to effect electroosmotic movement of humidity through said porous material.

In this way, the porous material acts as a filter to remove impurities from the water.

Preferably, the method is a method of raising the pH level in said water.

Each said pulse may comprise a third portion following said second portions and in which a third potential difference having an amplitude between that of said first and second portions is applied between said electrodes.

It has been found that the provision of such a third portion has the advantage of stabilising the system prior to repetition of the first portion of each pulse.

The amplitude of each said third portion may be substantially zero. Preferably, said first and/or second portions have substantially rectangular waveforms.

The first potential difference may vary from substantially +40V to substantially −40V.

In this case, said first potential difference is substantially 80V and the voltage applied to each said electrode differs by substantially 40V from earth potential.

This gives the advantage of improving the safety of the system by minimising the variation from earth potential of the voltage at each electrode.

The second potential difference may be substantially −40V.

In a preferred embodiment, the voltage applied to the metal reinforcement is applied in the form of a series of pulses.

By making the voltage of the metal reinforcement negative with respect to the porous material adjacent thereto by means of a series of pulses, the amount of current flow and thus the power consumption of the system is minimised.

Said voltage pulses are advantageously applied to said metal reinforcement during said first portion only of each pulse.

In a preferred embodiment, each said voltage pulse has an on portion and an off portion of substantially equal duration to the on portion.

Preferably, each said voltage pulse has an on portion having a duration of from substantially 0.001 seconds to substantially 1.0 seconds.

The duration of each said third portion may be from 0 to substantially 200% of said first portion.

In this case, the duration of the third portion may be from substantially 1% to substantially 200% of the duration of a said first portion.

The duration of each said second portion may be from 0 to substantially 90% of the duration of said first portion.

In this case, the duration of each said second portion is preferably from substantially 1% to substantially 90% of the duration of said first portion.

The method advantageously further comprises the step of automatically controlling the duration and/or amplitude of said portions in response to detected fluid conditions in the porous material.

This gives the advantage that by automatically controlling the amplitude and/or duration of the portions of the pulses by any suitable means such as a microprocessor in response to detected fluid conditions in the porous material, the efficiency of the system can be maximised.

According to another aspect of the invention there is provided a method of effecting fluid movement in porous geological media, the method comprising applying a sequence of voltage pulses between spaced apart first and second electrodes having a region of porous geological medium therebetween, each said voltage pulse comprising a first portion in which an electroosmotically active first potential difference is applied between said first and second electrodes to effect fluid movement in said region of porous geological medium, and a second portion in which a second potential difference of opposite polarity to said first potential difference is applied between said first and second electrodes.

The geological medium may be ground and the fluid may be water.

In a preferred embodiment, the method is a method of irrigation.

Alternatively, the method may be a method of water removal.

In a preferred embodiment, the geological medium comprises oil bearing strata and the fluid is water, wherein the method is a method of oil displacement as a result of water movement in the oil bearing strata.

Alternatively, the method may be a method of controlling pollution in the ground.

Preferably, the method further comprises the step of applying sequentially increasing voltages to said first electrode at respective locations of increasing depth in the geological medium.

In a preferred embodiment, said voltage pulses are applied to a plurality of said first electrodes.

Said voltage pulses may have a maximum amplitude of substantially 10,000 v to substantially 100,000 v.

Preferred embodiments of the invention will now be described, by way of example only, with reference to the accompanying drawings, in which.

Figure 1:
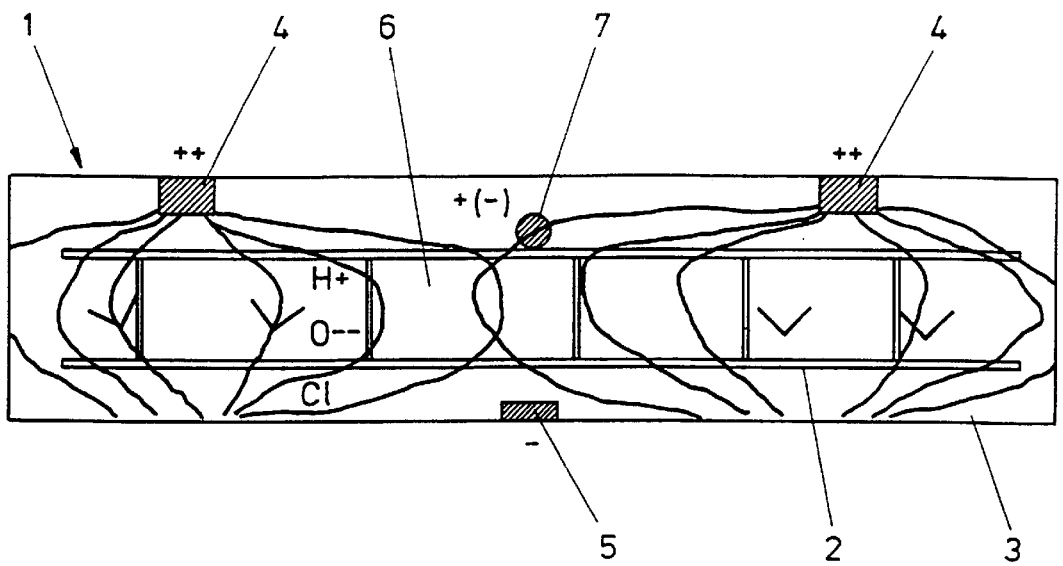
FIG. 1 is a schematic representation of electrode connection in a reinforced concrete block in a method embodying the present invention.

Referring in detail to FIG. 1, a metal reinforced concrete building element 1 has a reinforcing metal structure 2 embedded in concrete 3. A series of positive first electrodes 4 are embedded in one face of the concrete structure 1, and have spacing determined by the parameters of the particular process, but spacing would be typically of the order of 5 to 10 meters between electrodes 4.

A negative electrode 5 is embedded in the opposite face of the concrete structure 1, so that a potential difference applied to the electrodes 4, 5 causes an electric field to act across region 6 of the concrete 3 between the electrodes 4, 5 such that the region 6 at least partly encloses the metal reinforcing structure 2.

In addition, a positive electrode 7 is connected to the steel reinforcement 2 and a positive voltage having lower amplitude than that applied to electrodes 4 is applied to electrode 7. The electrodes 4, 7 may be surrounded by graphite material to enhance the electrical conductivity thereof.

Figure 2:
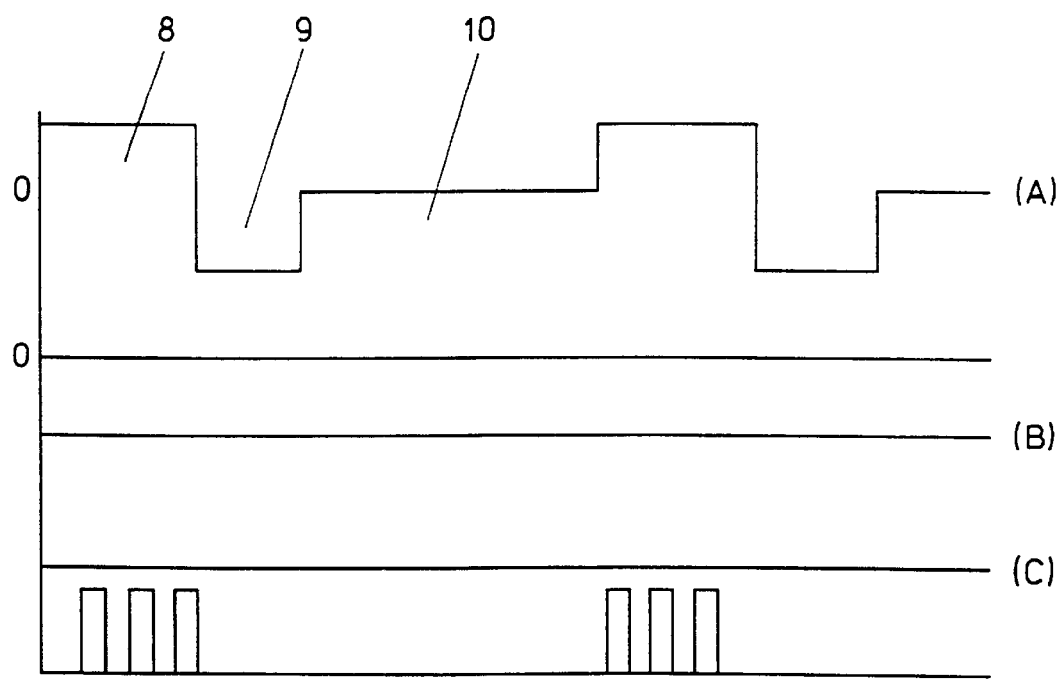
FIG. 2 is a pulse diagram showing a sequence of pulses applied to first and second electrodes and a steel reinforcement in a method embodying an aspect of the present invention.

As shown in greater detail in FIG. 2, a series of pulses (A) is applied to electrodes 4. Each pulse (A) has a duration of the order of substantially 0.1 ms to substantially 10 s and comprises a first portion 8 of amplitude of the order of 40 volts and duration 0.1 ms to 10 s, a second portion 9 of amplitude of the order of −40 volts and duration 0.1 ms to 10 s, and a third portion 10 of amplitude approximately equal to earth potential and duration 0.1 s to 10 s. At the same time, a constant negative voltage (B) of amplitude of the order of −40V is applied to electrode S. During first portion 8, therefore, a large positive potential difference exists between electrodes 4 and 5, which creates an electroosmotically active electric field across region 6 which causes electroosmotic fluid flow in the concrete 3 such that negative ions (including chloride ions) move towards positive electrodes 4 and hydrogen ions are attracted towards negative electrode 5. As a result, the first portion 8 of each pulse causes the humidity within the concrete 3 to be reduced to a level of the order of 60% to 70%, and the level of chlorides, which contribute to corrosion of the metal reinforcement 2, to be reduced, for example by up to 92% by weight of cement. The ph values in the concrete 3 also generally increase, typically up to a value of 12.5, but without generating potentially harmful pH levels as.a result of the first portion 8 of pulses (A).

At the same time, a series of chopped negative voltage pulses (C) is applied to the metal reinforcement 2 during the first portion 8 of pulses (A). This makes the electric potential of the metal reinforcement 2 negative with respect to the adjacent region 6 of concrete, which reduces the tendency of the metal reinforcement 2 to corrode, which would otherwise be exacerbated during the first portion 8 of the pulses (A).

In particular, table 1 below sets out a range of six pulse regimes A to F, in which the first to third columns respectively show the first 8, second 9, and third 10 portions of the pulse pattern applied between the electrodes 4, 5, and the fourth column represents the duration of the on portion of the chopped negative pulses applied to the metal reinforcement 2. The off portion of each pulse is generally equal in duration to the on portion.

TABLE 1

| PULSE PATTERN | POSITIVE | NEGATIVE | OFF | REBAR |
| --- | --- | --- | --- | --- |
| A | 8.2 SEC | 0.6 SEC | 0.4 SEC | 0.001 SEC |
| B | 6.2 SEC | 0.4 SEC | 0.3 SEC | 0.001 SEC |
| C | 5.2 SEC | 0.4 SEC | 0.3 SEC | 0.09 SEC |
| D | 6.0 SEC | 0.3 SEC | 0.3 SEC | 0.1 SEC |
| E | 8.2 SEC | 0.7 SEC | 0.4 SEC | 0.15 SEC |
| F | 4.0 SEC | 0.3 SEC | 0.3 SEC | 0.15 SEC |

As a result of the potential difference caused by the first portion 8 of pulses (A), after the system has been in operation for some time, electrode 5 becomes covered in a film of hydrogen gas, which impairs the electrical characteristics of the system and results in lower operating efficiency. By reversing the polarity in the second portion 9 relative to the first portion 8, the formation of gas or other insulating films of the electrodes 4, 5 is either prevented or reduced to an acceptable level. However, because the energy transfer of the first portion 8 is greater than that of the second portion 9, there is a net osmotic energy transfer, which causes a net reduction in the humidity of region 6 of the concrete 3.

It has been found that the third portion 10 has advantageous effects in re-setting the conditions within the concrete 3 before arrival of the first portion 8 of the next pulse (A).

In order to improve the electrical characteristics of the system, positive electrodes 4, 7 are surrounded by a graphite enriched cement, whilst the negative electrode 5 is covered with a highly cementitious repair compound. While the spacing between the positive electrodes 4 may be 5 to 10 meters, it has been found that a particularly advantageous spacing in the context of building materials is 8 meters, whereas the spacing in prior art systems would typically be of the order of 30cm. This therefore has advantageous effects in reducing the number of electrodes 4 that are necessary.

The amount of power used by the system will be a maximum when the system is first started (i.e. when the humidity within region 6 of the concrete 3 is high). When the system has been operating for some time, the parameters of the pulse wave forms (A) and (C) can be adjusted. Accordingly, the humidity conditions within the concrete 3 can be monitored by means of suitable probes or sensors (not shown) which in turn can be connected via a suitable control means such as a micro processor to a pulse generator (not shown) for producing wave forms (A), (B) and (C).

Table 2 below shows the pulse patterns of Table 1 which provide the most favourable results over a predetermined range of relative humidity in concrete of various qualities.

TABLE 2

| RELATIVE HUMIDITY IN CONCRETE | C25 | C35 | C45 | C60 | >C60 |
| --- | --- | --- | --- | --- | --- |
| 100 | A | A | A | B | B |
| 99 | B | B | B | A | A |
| 94 | C | C | C | C | C |
| 86 | D | D | D | C | C |
| 74 | E | E | E | D | D |
| 70 | E | E | E | E | E |
| 63 | F | F | F | F | F |

The most efficient pulse pattern to use in:
Clay—A and B
Sandstone—B, C, D and F
Earth—C, D and F
Sand—C and F Whilst the above embodiment describes a method of controlling humidity in a steel reinforced concrete element 1, and thereby controlling the corrosion thereof, in a further embodiment of the invention, the polarity of the voltages applied to electrodes 4, 5 can be reversed with respect to the arrangements shown in FIGS. 1 to 3 in a sacrificial reinforced concrete block which is immersed in water. Application of the pulses (A) to (C) then causes humidity to move through the concrete block by means of electroosmosis, as a result of which the concrete block acts as a filter and removes impurities from the water, and also raises the pH level in the water surrounding the concrete block.

The method of removing impurities from water and/or raising the pH level of water as described above can be applied to the control of pollution of bodies of water, for example lakes. In order to make the system as efficient as possible, the negative electrode is placed as close as possible to the body of the concrete block, which typically has a quality of C25 to C45, and voltage pulses of amplitude 40V to 10,000V are typically applied. As will be appreciated by persons skilled in the art, the process can be regulated in response to a pH probe placed some distance from the concrete block, and it is also envisaged that a power supply could be derived from solar panels. This would enable the process to be used in locations distant from electrical mains supply.

Figure 3:
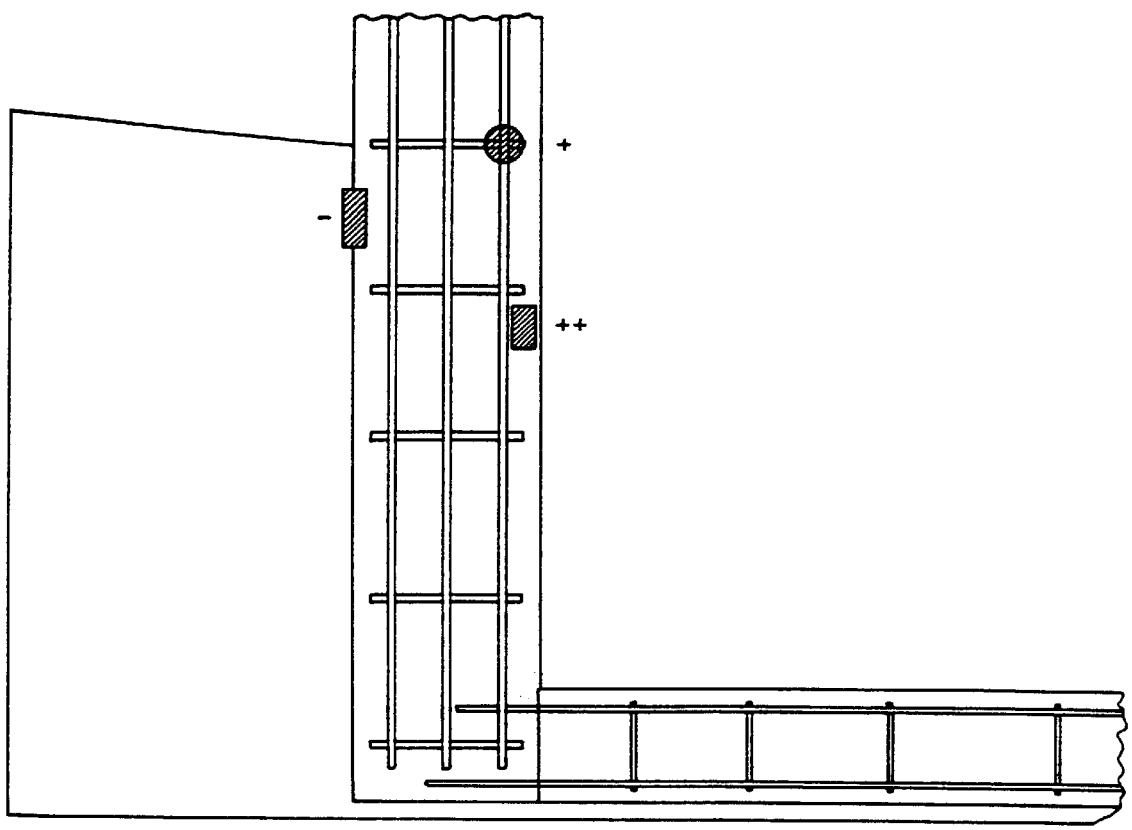
FIG. 3 is a further illustration of the arrangement of FIG. 1.
Figure 4:
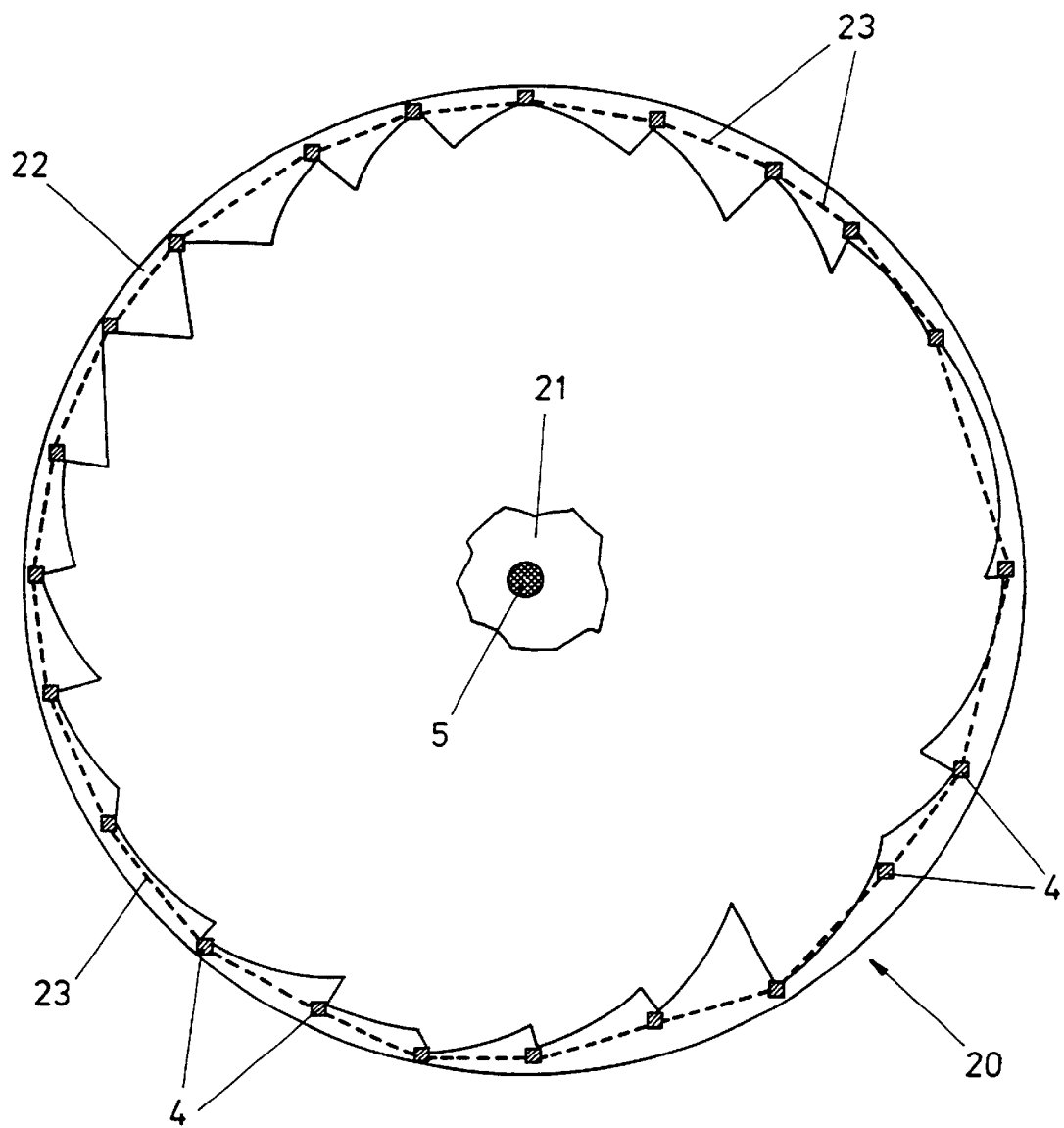
FIG. 4 is a schematic cross-sectional plan view of a method of irrigation embodying an aspect of the present invention.

Referring now to FIG. 4, in which parts common to FIGS. 1 to 3 are denoted by like reference numerals, an irrigation system 20 comprises a well 21 provided in the ground 22, and an elongate negative electrode 5 is arranged vertically in the well 21. A series of vertically arranged elongate positive electrodes 4 are arranged at generally equi-angularly spaced intervals around the circumference of a circle at the centre of which the negative electrode 5 is arranged, and neighbouring positive electrodes 4 are connected to each other by means of EPDM cables 23. The spacing between neighbouring positive electrodes 4 will depend upon a number of factors, including the electrical resistance of the ground and its capillary pore size. The higher the electrical resistance, or the larger the pore size, the shorter will be the distance between the electrodes, and will typically be between 1 and 30 meters. Each of the positive electrodes 4 consists of an elongate rod forming an active electrode such that voltages of increasing amplitude with depth below the ground surface can be applied to the electrodes 4.

Figure 6:
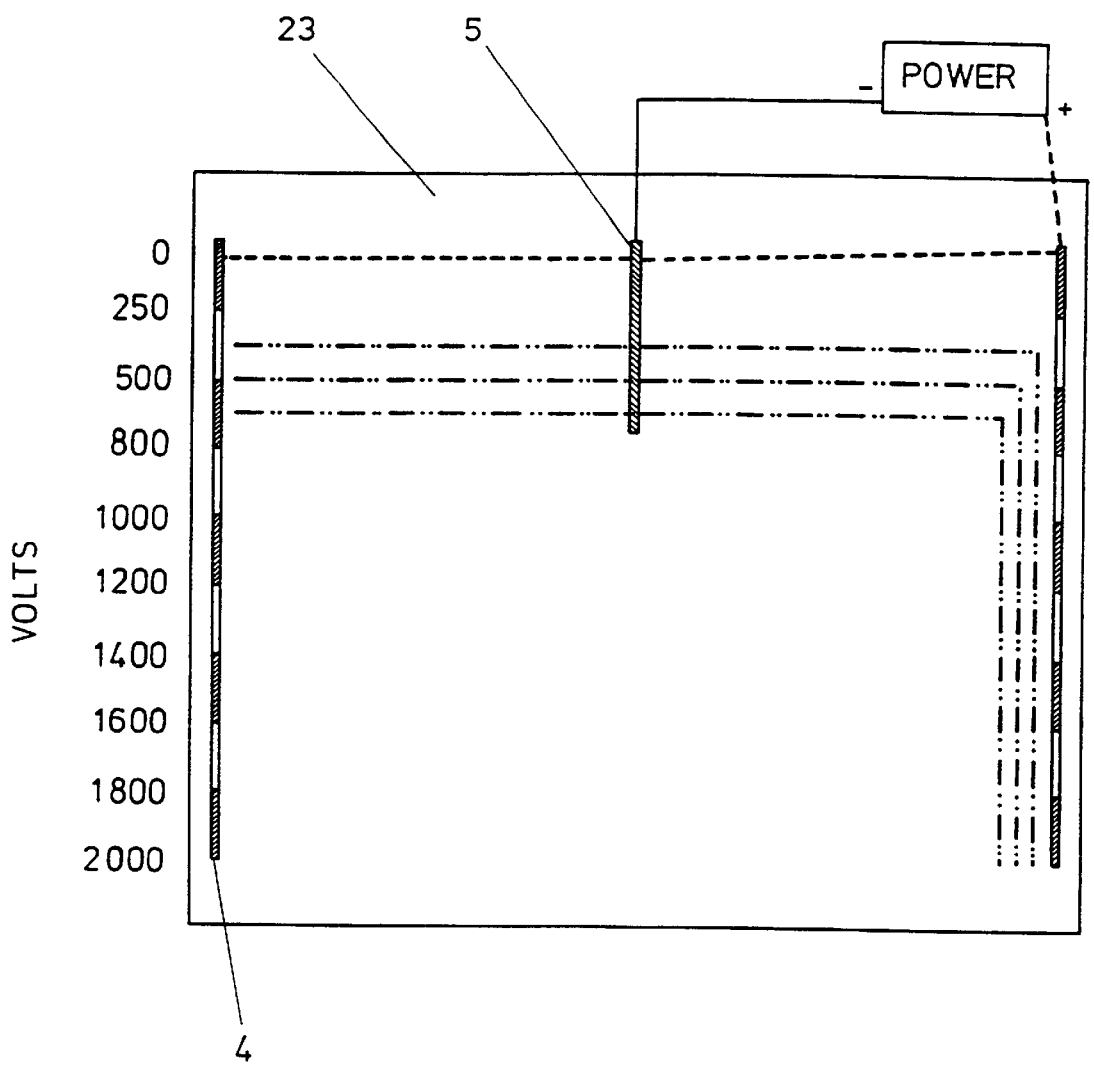
FIG. 6 is a cross-sectional elevational view of an irrigation system embodying an aspect of the present invention.

When a pulse sequence of general shape similar to that of sequence (A) shown in FIG. 2 is applied to the positive electrodes 4 while a voltage of constant amplitude is applied to the negative electrode rod 5, migration of moisture in the ground is caused by electroosmosis, as illustrated generally in FIG. 6.

Figure 5:
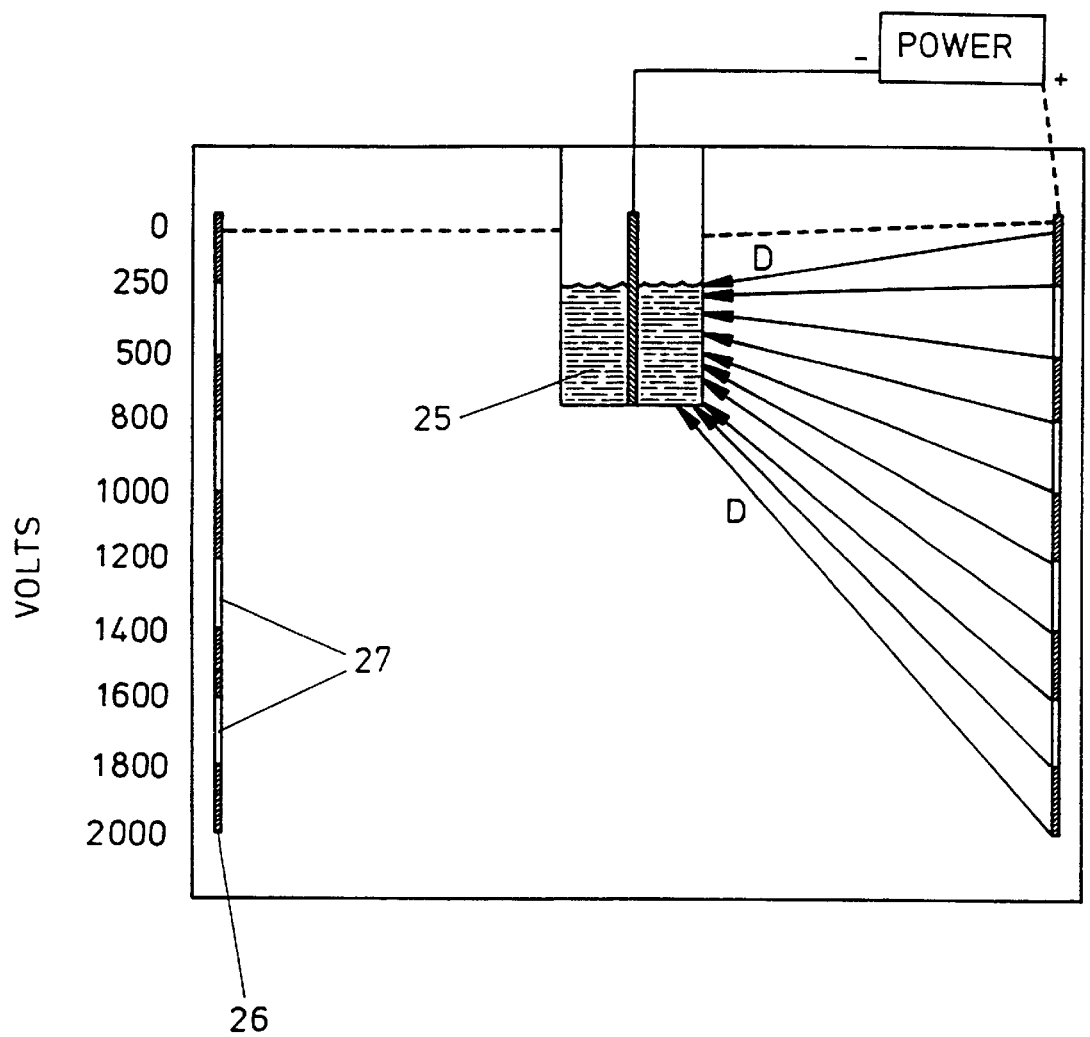
FIG. 5 is a cross-sectional elevational view of a system for ground water collection embodying an aspect of the invention.

Referring now to FIG. 5, the process of FIG. 4 can be adapted to collect water from a region of the ground into a water collection point 25. As is the case in the system shown in FIG. 4, each positive electrode 4 comprises an elongate rod 26 having adjacent voltage application regions 27 such that voltages with amplitude increasing with depth below the ground surface can be applied to the electrodes 4. The amplitude of the voltage pulse will be of the order of 40 v to 100,000 v. When a pulse sequence having shaped generally similar to that of sequence (A) shown in FIG. 2 is applied to the electrodes 4, water molecules in the porous ground migrate towards water collection point 25 as shown by arrows D.

As can be seen from FIGS. 5 and 6, when the pulse sequences described above are applied between the positive and negative electrodes, water will tend to migrate directly from the positive electrodes to the negative electrode. However, because the lower regions of each positive electrode have a positive polarity relative to the adjacent part of each electrode, there will also be a tendency for water to migrate upwards in the region of each positive electrode 4. The provision of positive electrodes having voltages of increasing amplitude with depth below the surface thus serves the dual purpose of assisting in upward water migration, while increasing safety in that those parts of the positive electrodes 4 adjacent the ground surface have lower voltage. It will be appreciated by persons skilled in the art that the methods shown in FIGS. 5 and 6 can be applied to a process in which water is added to or removed from clay or ground having a high clay content. As will be appreciated by persons skilled in the art, by suitable modification of the method shown with reference to FIGS. 5 and 6, water can be caused to move further downwards into the ground away from a building structure or area of ground which is too wet.

Figure 7A:
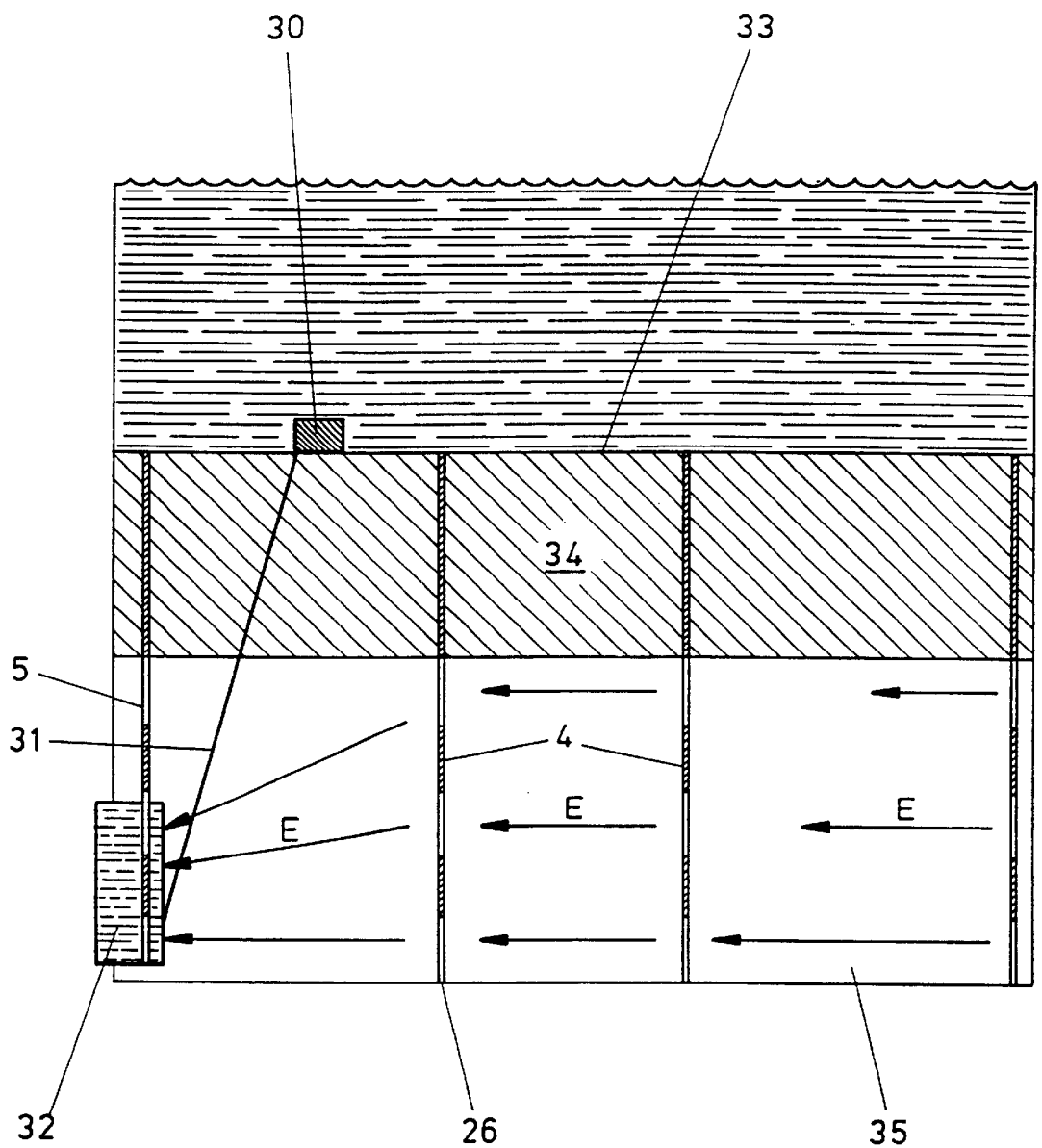
FIGS. 7a and 7b are cross-sectional elevational views of systems for extracting oil through oil bearing strata embodying an aspect of the present invention.
Figure 7B:
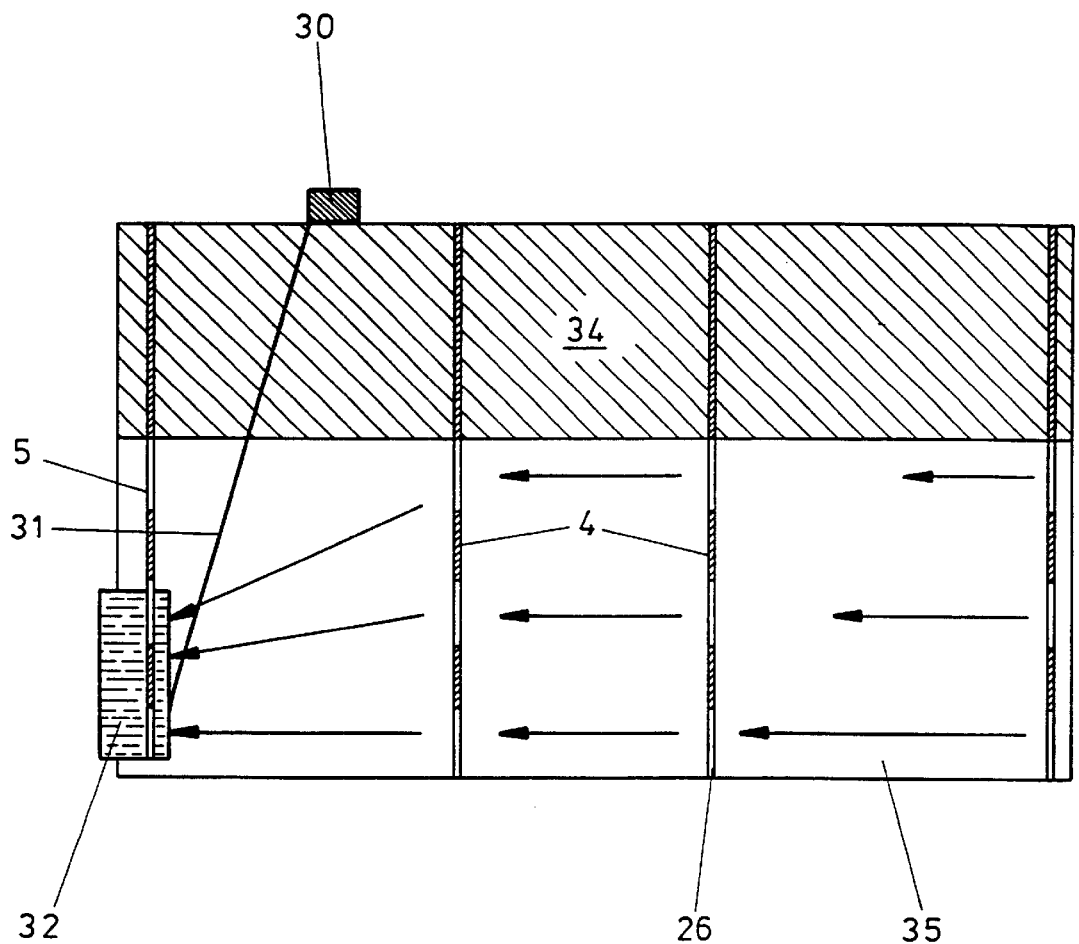

Referring to FIGS. 7a and 7b, an under sea oil well system comprises a well head 30, pipe work 31 connected thereto, and a collection region 32 at the end of the pipe work 31 remote from the well head 30. A series of positive electrodes 4 in the form of elongate rods 26 similar to those shown in FIGS. 4 to 6 are arranged at spaced apart locations passing from the sea bed 33 through mineral strata 34 to oil bearing strata 35. A negative electrode 5 in the form of a similar elongate rod passes from the sea bed through mineral strata 24 into the oil bearing strata 35 such that the collection point 31 is arranged at the lower end of electrode 5.

Oil is a non-conductive liquid, and cannot therefore be directly moved by means of an electroosmotic system as described above. However, natural ground water in the oil bearing strata can be moved by means of a voltage pulse sequence of shape similar to those shown in FIG. 2 applied between positive electrodes 4 and negative electrode 5. Such movement of the ground water effects movement of oil trapped within the pore structure of the oil bearing strata 35 with the result that oil migrates towards the collection region 32 as shown by arrows E, and such collection in a single region therefore facilitates extraction of the oil to the well head 30.

FIG. 7b shows a similar system to that of FIG. 7a, but in which the oil extraction system is not located at the sea bottom.

Figure 8:
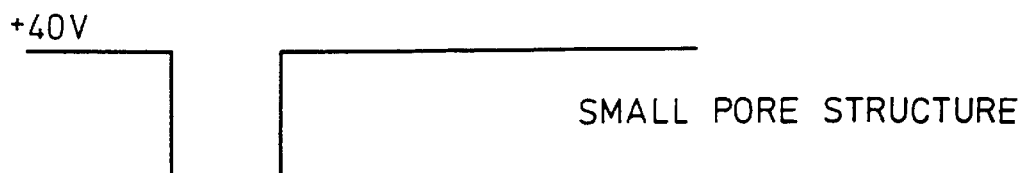
FIG. 8 is a pulse diagram showing the variation of pulse lengths with variation in size of the pore structure.
Figure 8:
Figure 8:

Finally, FIG. 8 shows how the length of the first, second and third portions of the pulses applied between the positive 4 and negative 5 electrodes varies in length depending upon the size of the pore structure of the porous material in which fluid movement is to be effected. It can therefore be seen that higher pulse frequencies are appropriate for smaller pore sizes. The system of the embodiments of the present invention can therefore be controlled by any suitable means, such as a microprocessor in order to maintain the optimum pulse shape and/or frequency.

It will be appreciated by persons skilled in the art that the above embodiments have been described by way of example only and not in any limitative sense, and that various modifications and alterations are possible without departing from the scope of the invention as defined by the appended claims.

What is claimed is:

1. A method of effecting fluid movement in metal reinforced porous materials, the method comprising applying a sequence of voltage pulses between spaced apart first and second electrodes having a region of the porous material therebetween, each said voltage pulse comprising a first portion in which an electoosmotically active first potential difference is applied between said first and second electrodes to effect fluid movement in said region of porous material, and a second portion in which a second potential difference of opposite polarity to said first potential difference is applied between said first and second electrodes; and applying an additional voltage to a metal reinforcement located at least partly in said region of porous material to make the voltage of said metal reinforcement negative with respect to the porous material adjacent thereto for at least part of said sequence of voltage pulses.

2. A method according to claim 1, wherein the method is a method of controlling humidity in a metal reinforced building material, and wherein said first potential difference is positive.

3. A method according to claim 2, wherein said building material is concrete.

4. A method according to claim 1, wherein the method is a method of treating water in which said porous material is immersed, and in which said first potential difference is negative to effect electroosmotic movement of humidity through said porous material.

5. A method according to claim 4, wherein the method is a method of raising the pH level in said water.

6. A method according to claim 1, wherein each said pulse comprises a third portion following said second portion and in which a third potential difference having an amplitude between that of said first and second portions is applied between said electrodes.

7. A method according to claim 6, wherein the amplitude of each said third portion is substantially zero.

8. A method according to claim 6, wherein the duration of each said third portion is from 0 to substantially 200% of said first portion.

9. A method according to claim 8, wherein the duration of the third portion is from substantially 1% to Substantially 200% of the duration of a said first portion.

10. A method according to claim 1, wherein said first and/or second portions have substantially rectangular waveforms.

11. A method according to claim 1, wherein said first potential difference varies from substantially +40V to substantially −40V.

12. A method according to claim 11, wherein said first potential difference is substantially 80V and the voltage applied to each said electrode differs by substantially 40V from earth potential.

13. A method according to claim 1, wherein said second potential difference is substantially −40V.

14. A method according to claim 1, wherein the voltage applied to the metal reinforcement is applied in the form of a series of pulses.

15. A method according to claim 14, wherein said voltage pulses are applied to said metal reinforcement during said first portion only of each pulse.

16. A method according to claim 14, wherein each said voltage pulse has an ON portion and an OFF portion of substantially equal duration to the ON portion.

17. A method according to claim 14, wherein each said voltage pulse has an ON portion having a duration of from substantially 0.001 seconds to substantially 1.0 seconds.

18. A method according to claim 1, wherein the duration of each said second portion is from 0 to substantially 90% of the duration of the first portion.

19. A method according to claim 18, wherein the duration of each said second portion is from substantially 1% to substantially 90% of the duration of said first portion.

20. A method according to claim 1, further comprising the step of automatically controlling the duration and/or amplitude of said portions in response to detected fluid conditions in the porous material.

21. A method of effecting fluid movement in porous geological media, the method comprising applying a sequence of voltage pulses between spaced apart first and second electrodes having a region of porous geological medium therebetween, said each voltage pulse comprising a first portion in which an electroosmotically active first potential difference is applied between said first and second electrodes to effect fluid movement in said region of porous geological medium, and a second portion in which a second potential difference of opposite polarity to said first potential difference is applied between said first and second electrodes.

22. A method according to claim 21, wherein the geological medium is ground and the fluid is water.

23. A method according to claim 22, wherein the method is a method of water removal.

24. A method according to claim 21, wherein the method is a method of irrigation.

25. A method according to claim 21, wherein the geological medium comprises oil-bearing strata and the fluid is water, and wherein the method is a method of oil displacement as a result of water movement in the oil-bearing strata.

26. A method according to claim 21, further comprising the step of applying sequentially increasing voltages to said first electrode at respective locations of increasing depth in the geological medium.

27. A method according to claim 21, wherein said voltage pulses are applied to a plurality of said first electrodes.

28. A method according to claim 21, wherein said voltage pulses have a maximum amplitude of substantially 10,000V to substantially 100,000V.

* * * * *